US012747957B2

(12) United States Patent
Goldman et al.

(10) Patent No.: US 12,747,957 B2
(45) Date of Patent: Sep. 29, 2026

(54) AUTONOMOUS VEHICLE PLANNED ROUTE PREDICTION

(71) Applicant: Uber Technologies, Inc., San Francisco, CA (US)

(72) Inventors: Brent Goldman, San Francisco, CA (US); Jacob Robert Forster, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 228 days.

(21) Appl. No.: 17/249,020

(22) Filed: Feb. 17, 2021

(65) Prior Publication Data

US 2022/0065647 A1 Mar. 3, 2022

Related U.S. Application Data

(60) Provisional application No. 62/706,622, filed on Aug. 28, 2020.

(51) Int. Cl.
*G01C 21/34* (2006.01)
*G06Q 10/04* (2023.01)
(Continued)

(52) U.S. Cl.
CPC ......... *G01C 21/3492* (2013.01); *G06Q 10/04* (2013.01); *G08G 1/202* (2013.01); *G06Q 50/40* (2024.01)

(58) Field of Classification Search
CPC ............ G01C 21/3492; G01C 21/3407; G01C 21/3461; G06Q 10/04; G06Q 50/30; G06Q 10/047; G08G 1/202
See application file for complete search history.

(56) References Cited

U.S. PATENT DOCUMENTS 10,248,120 B1 * 4/2019 Siegel .................. G05D 1/0088
2017/0123421 A1 * 5/2017 Kentley ................. G05D 1/695
(Continued)

FOREIGN PATENT DOCUMENTS

WO WO-2020142548 A1 * 7/2020 ............. G01C 21/20
WO 2022047476 3/2022

OTHER PUBLICATIONS

"International Application Serial No. PCT US2021 071275, International Search Report mailed Nov. 26, 2021", 4 pgs.
(Continued)

*Primary Examiner* — Faris S Almatrahi
*Assistant Examiner* — Dana F Artimez
(74) *Attorney, Agent, or Firm* — Schwegman Lundberg & Woessner, P.A.

(57) ABSTRACT

Various examples are directed to systems and methods for providing transportation services. A service assignment system may receive a transportation service request from a user. The transportation service request may describe a transportation service having a start location and an end location. The service assignment system may select a first autonomous vehicle (AV) of a first AV type and determine a first predicted route for the first AV using vehicle capability data describing the first AV type and first difference data describing a difference between a previous predicted route for a previous AV of the first AV type and a previous planned route received from the previous AV of the first AV type. The service assignment system may receive, from the first AV, a first planned route for executing the transportation service and instruct the first AV to begin executing the transportation service.

20 Claims, 7 Drawing Sheets

(51) Int. Cl.
*G06Q 50/40* (2024.01)
*G08G 1/00* (2006.01)

(56) References Cited

U.S. PATENT DOCUMENTS

| | | | | |
|---|---|---|---|---|
| 2017/0356751 | A1* | 12/2017 | Iagnemma | G05D 1/0214 |
| 2018/0137454 | A1* | 5/2018 | Kulkarni | G05D 1/0027 |
| 2018/0329428 | A1* | 11/2018 | Nagy | G08G 1/207 |
| 2019/0113925 | A1* | 4/2019 | Sim | G01C 21/3848 |
| 2019/0120640 | A1* | 4/2019 | Ho | G01C 21/3461 |
| 2019/0377349 | A1* | 12/2019 | van Der Merwe | G06Q 10/08 |
| 2020/0050198 | A1* | 2/2020 | Donnelly | G06Q 50/30 |
| 2020/0166936 | A1 | 5/2020 | Voznesensky et al. | |
| 2020/0356115 | A1* | 11/2020 | Kubie | G08G 5/26 |
| 2021/0004363 | A1* | 1/2021 | Bailly | G06T 17/05 |

OTHER PUBLICATIONS

"International Application Serial No. PCT US2021 071275, Written Opinion mailed Nov. 26, 2021", 6 pgs.
"International Application Serial No. PCT US2021 071275, International Preliminary Report on Patentability mailed Mar. 9, 2023", 8 pgs.

* cited by examiner

AUTONOMOUS VEHICLE PLANNED ROUTE PREDICTION

CLAIM FOR PRIORITY

This application claims the benefit of priority to U.S. Application Ser. No. 62/706,622, filed Aug. 28, 2020, which is hereby incorporated by reference in its entirety.

FIELD

This document pertains generally, but not by way of limitation, to devices, systems, and methods for routing, operating, and/or managing an autonomous vehicle (AV).

BACKGROUND

An autonomous vehicle (AV) is a vehicle that is capable of sensing its environment and operating some or all of the vehicle's controls based on the sensed environment. An AV includes sensors that capture signals describing the environment surrounding the vehicle. The AV processes the captured sensor signals to comprehend the environment and automatically operates some or all of the vehicle's controls based on the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
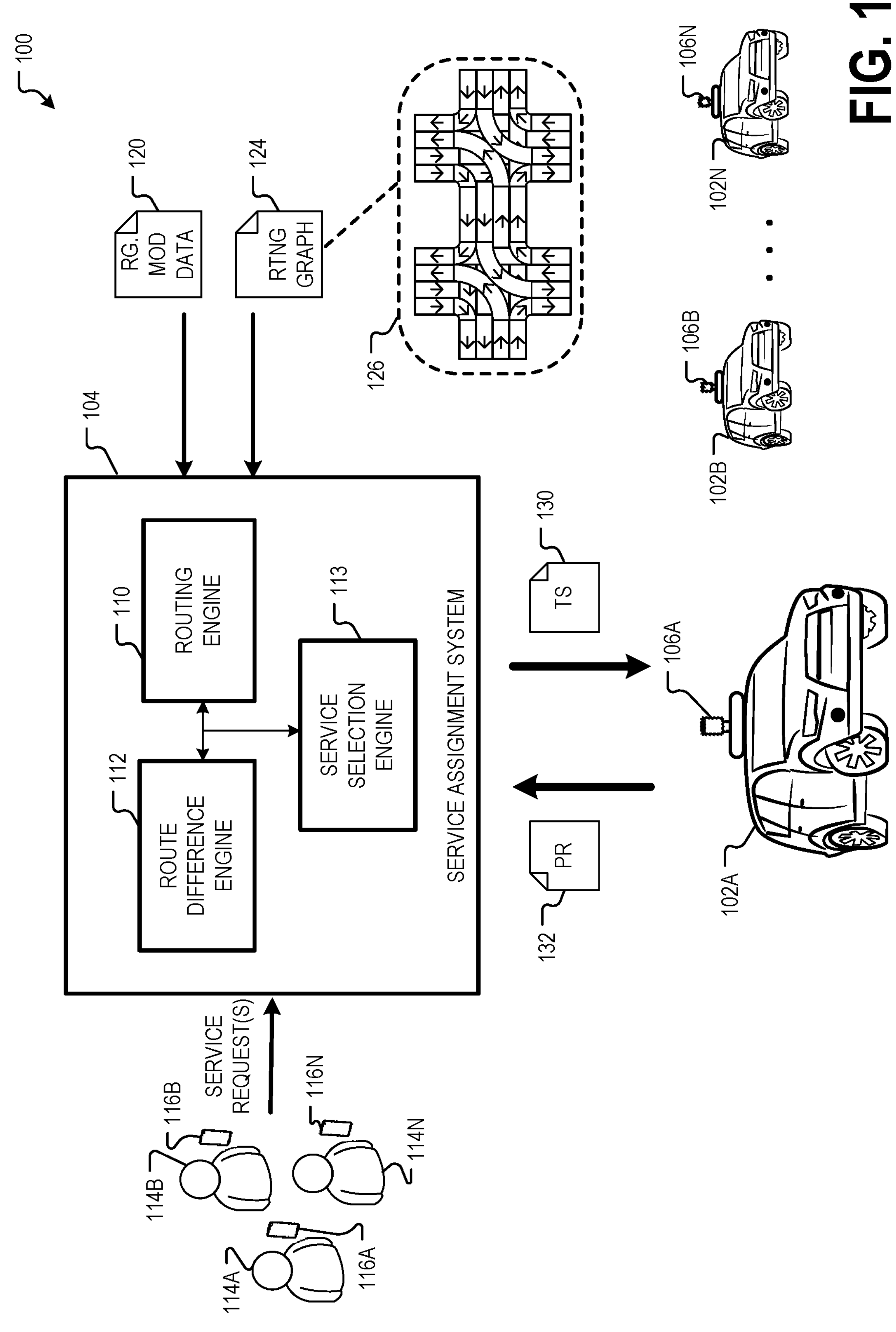
FIG. 1 is a diagram showing one example of an environment for assigning transportation services to AVs considering planned route prediction.

Examples described herein are directed to systems and methods for routing AVs to execute transportation services. A transportation service includes transporting a payload, such as cargo or one or more passengers, from a service start location to a service end location. Examples of cargo can include food, packages, or the like.

In an autonomous or semi-autonomous vehicle (collectively referred to as an AV), a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some AVs can also operate in a manual mode, in which a human user provides all control inputs to the vehicle.

In some examples, a service assignment system is configured to receive requests for transportation services from users. The service assignment system selects an AV to execute the transportation service for the user and instructs the AV to begin executing the transportation service.

Assigning transportation services to AVs creates problems that may not be encountered with human-operated vehicles. For example, different AVs having different capabilities may be routed differently. Some AVs may deliberately route around roadway features such as, for example, unprotected left turns, while other types of AVs may not. Also, different types of AVs may have different policies about whether or when to traverse potentially sensitive roadway elements, such as those in school zones, parks, and so forth.

The challenges of assigning transportation services to autonomous vehicles can be enhanced when the AVs are routed by a routing engine separate from the service assignment system. For example, some AVs for executing transportation services assigned by the service assignment system may be routed by onboard routing engines and/or by routing engines remote from the AVs but also separate from the service assignment system. This can make it more difficult for the service assignment system to select the best AVs for a transportation service.

Various examples address these and other issues utilizing route prediction. A service assignment system receives a transportation service request from a user. The service assignment system selects a first AV that is capable of executing the transportation service. The service assignment system determines a predicted route for the AV. The predicted route is a route for executing the transportation service generated by the service assignment system. The service assignment system may prompt the AV to provide a planned route for the transportation service. The planned route is a route for the transportation service generated by the AV's routing engine, which may be onboard the AV or at a remote location. The service assignment system determines whether the planned route is acceptable. Provided that the planned route is acceptable, the service assignment system instructs the first AV to begin executing the transportation service.

The predicted route for the AV generated by the service assignment system may be based on difference data describing a difference between previous predicted routes for AVs of the same type as the first AV and planned routes provided to the service assignment system. In some examples, the service assignment system utilizes the difference data to identify one or more sets of common roadway element properties, conditions, and/or risks. If a roadway element from the difference data is determined to have common roadway element properties, conditions, and/or risks, the service assignment system may take an appropriate remedial action.

In some examples, a remedial action includes changing the way that the service assignment system generates predicted routes. For example, if the difference data describes a set of roadway elements having a common property, then the service assignment system may modify a routing rule for vehicles of the same type as the first AV to avoid and/or disfavor roadway elements having the common property. In another example, if the difference data describes a set of roadway elements having a common status at the time that the first AV traversed or would have traversed the roadway elements, then the service assignment system may modify a routing rule for vehicles of the same type as the first AV to avoid and/or disfavor roadway elements having the common status.

Another example remedial action includes changing an AV selection rule for the AV type. For example, if the difference data indicates that the first AV deviated from the planned route by traversing roadway elements having a higher risk to traverse, then the service assignment system may disfavor AVs of the first AV type for future transportation services.

FIG. 1 is a diagram showing one example of an environment 100 for assigning transportation services to AVs considering planned route prediction. The environment 100 includes a service assignment system 104 and AVs 102A, 102B, 102N. The AVs 102A, 102B, 102N can include passenger vehicles, such as trucks, cars, buses, or other similar vehicles. The AVs 102A, 102B, 102N can also include delivery vehicles, such as vans, trucks, tractor trailers, and so forth. Although FIG. 1 shows three AVs 102A, 102B, 102N, any suitable number of vehicles may be used.

Figure 2:
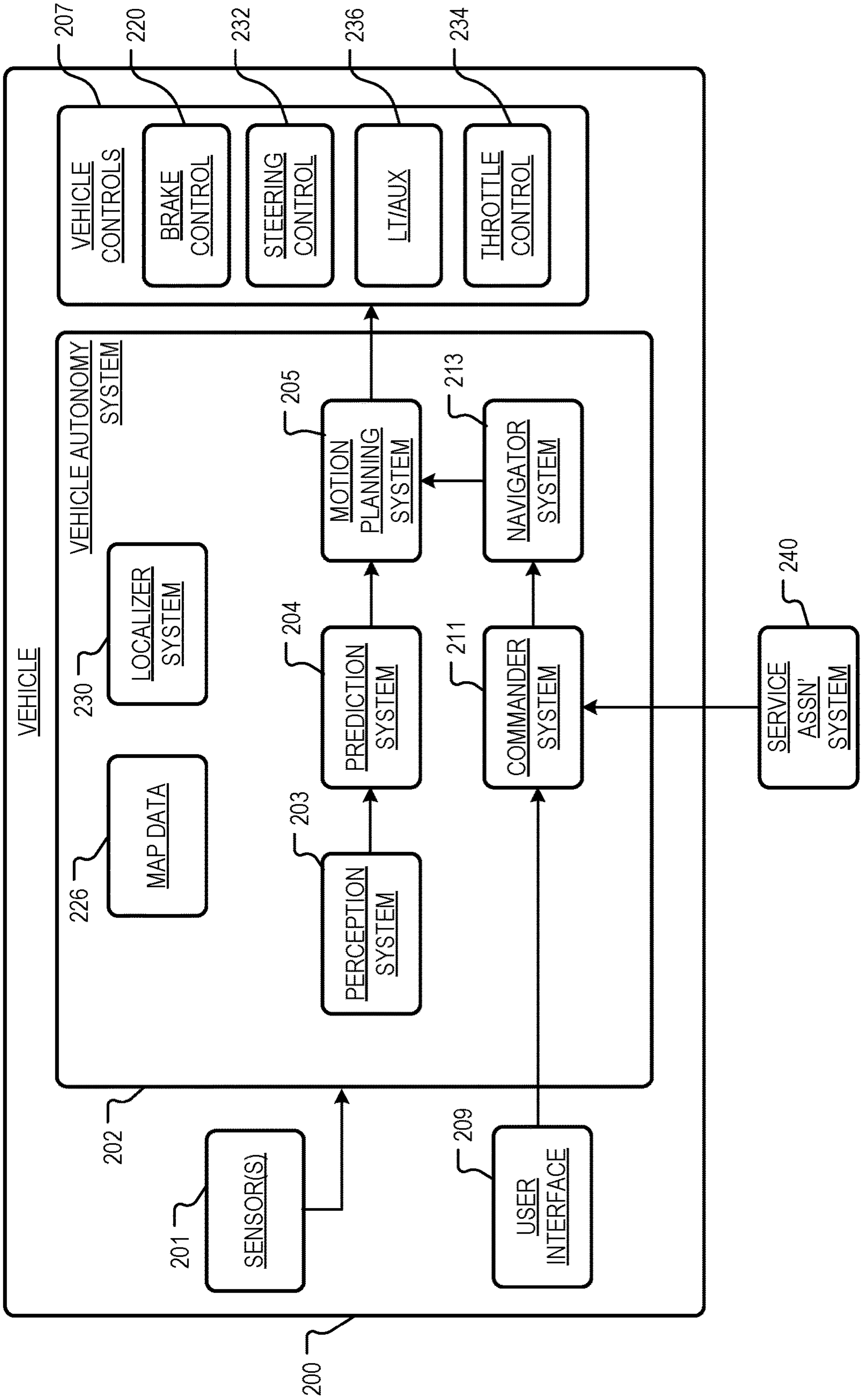
FIG. 2 depicts a block diagram of an example vehicle, according to example aspects of the present disclosure.

Each of the AVs 102A, 102B, 102N includes a vehicle autonomy system, described in more detail with respect to FIG. 2. The vehicle autonomy system is configured to operate some or all of the controls of the AV 102A, 102B, 102N (e.g., acceleration, braking, steering). In some examples, one or more of the AVs 102A, 102B, 102N are operable in different modes, where the vehicle autonomy system has differing levels of control over the AV 102A, 102B, 102N. Some AVs 102A, 102B, 102N may be operable in a fully autonomous mode in which the vehicle autonomy system has responsibility for all or most of the controls of the AV 102A, 102B, 102N. Some AVs 102A, 102B, 102N are operable in a semiautonomous mode that is in addition to or instead of the fully autonomous mode. In a semiautonomous mode, the vehicle autonomy system of an AV 102A, 102B, 102N is responsible for some of the vehicle controls while a human user or driver is responsible for other vehicle controls. In some examples, one or more of the AVs 102A, 102B, 102N are operable in a manual mode in which the human user is responsible for all control of the AV 102A, 102B, 102N.

The AVs 102A, 102B, 102N include one or more remote-detection sensor sets 106A, 106B, 106N. The remote-detection sensor sets 106A, 106B, 106N include one or more remote-detection sensors that receive signals from the environment 100. The signals may be emitted by and/or reflected from objects in the environment 100, such as the ground, buildings, trees, and so forth. The remote-detection sensor sets 106A, 106B, 106N may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the received signals. In some examples, the remote-detection sensor sets 106A, 106B, 106N include one or more passive sensors that receive signals that originated from other sources of sound or electromagnetic radiation. The remote-detection sensor sets 106A, 106B, 106N provide remote-detection sensor data that describes the environment 100. The AVs 102A, 102B, 102N can also include other types of sensors, for example, as described in more detail with respect to FIG. 2.

The AVs 102A, 102B, 102N may be of different types. Different types of AVs may have different capabilities. For example, the different types of AVs 102A, 102B, 102N can have different vehicle autonomy systems. This can include, for example, vehicle autonomy systems made by different manufacturers or designers, vehicle autonomy systems having different software versions or revisions, and so forth. Also, in some examples, the different types of AVs 102A, 102B, 102N can have different remote-detection sensor sets 106A, 106B, 106N. For example, one type of AV 102A, 102B, 102N may include a LIDAR remote-detection sensor, while another type of AV 102A, 102B, 102N may include stereoscopic cameras and omit a LIDAR remote-detection sensor. In some examples, different types of AVs 102A, 102B, 102N can also have different mechanical particulars. For example, one type of vehicle may have all-wheel drive, while another type may have front-wheel drive, and so forth.

The service assignment system 104 is programmed to assign transportation services to the AVs 102A, 102B, 102N as described herein. The service assignment system 104 can be or include one or more servers or other suitable computing devices. The service assignment system 104 is configured to receive transportation service requests from one or more users 114A, 114B, 114N. The users 114A, 114B, 114N make transportation service requests with user computing devices 116A, 116B, 116N. The user computing devices 116A, 116B, 116N can be or include any suitable computing device such as, for example, tablet computers, mobile telephone devices, laptop computers, desktop computers, and so forth. In some examples, the user computing devices 116A, 116B, 116N execute an application associated with a transportation service implemented with the service assignment system 104. The users 114A, 114B, 114N launch the application on the respective user computing devices 116A, 116B, 116N and utilize functionality of the application to make transportation service requests.

The service assignment system 104 comprises a service selection engine 113, a routing engine 110, and a route difference engine 112. The service selection engine 113 is programmed to receive and process transportation service requests. Upon receiving a transportation service request, the service selection engine 113 may select one or more candidate AVs 102A, 102B, 102N for executing the service. The set of candidate AVs 102A, 102B, 102N can include one or more AVs 102A, 102B, 102N that are best suited for executing the transportation service. For example, the set of candidate AVs 102A, 102B, 102N can include one or more AVs 102A, 102B, 102N that are near to a transportation service start location (e.g., within a threshold distance, within a threshold drive time, etc.).

In some examples, the candidate AVs 102A, 102B, 102N are limited to vehicles capable of executing the transportation service. For example, a transportation service that involves moving a large cargo object may be executable only by AVs 102A, 102B, 102N having sufficient space to carry the large object. A transportation service that involves moving, for example, five passengers may be executable only by AVs 102A, 102B, 102N having sufficient space to carry five passengers.

The routing engine 110 and route difference engine 112 are used to generated predicted routes for the one or more candidate AVs 102A, 102B, 102N. For example, the service selection engine 113 may provide the routing engine 110 with an indication of one or more candidate AVs 102A, 102B, 102N. The routing engine 110 generates a predicted route for some or all of the set of candidate AVs 102A, 102B, 102N. The predicted route for an AV 102A, 102B, 102N may begin at a current location of a candidate AV 102A, 102B, 102N and extend to the transportation service start location and transportation service end location. If the transportation service includes one or more waypoints, then the predicted route will also pass these waypoints.

The routing engine 110 of the service assignment system 104 generates predicted routes using a routing graph 124. The routing graph 124 is a representation of the roadways in a geographic area. The routing graph 124 represents the roadways as a set of graph elements. A graph element is a component of a routing graph 124 that represents a roadway element on which the AV can travel. A graph element can be or include an edge, node, or other component of a routing graph. A graph element represents a portion of roadway, referred to herein as a roadway element. A roadway element is a component of a roadway that can be traversed by a vehicle.

A roadway element may be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway would include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and also laterally. For example, a vehicle traversing a lane segment may travel in the direction to travel to the next connected lane segment or may make a lane change to move laterally to a different lane segment.

The routing graph 124 indicates data describing directionality and connectivity for the graph elements. The directionality of a graph element describes limitations, if any, on the direction in which a vehicle can traverse the roadway element corresponding to the graph element. The connectivity of a given graph element describes other graph elements to which the AV can be routed from the given graph element.

The routing graph 124 can also include cost data describing costs associated with graph elements. The cost data indicates the cost for a vehicle to traverse a roadway element corresponding to a graph element or to transition between roadway elements corresponding to connected graph elements. Cost can be based on various factors including, for example, estimated driving time, danger risk, and so forth. In some examples, higher cost generally corresponds to more negative characteristics of a graph element or transition (e.g., longer estimated driving time, higher danger risk). The routing engine generates routes for vehicles by finding a low-cost combination of connected graph elements corresponding to a sequence of roadway elements between two locations.

In FIG. 1, a break-out window 126 shows example roadway elements that can correspond to the graph elements of the routing graph 124. Roadway elements in the break-out window 126 are illustrated as shapes with arrows indicating the directionality of the roadway elements. Roadway elements can be connected to one another according to their directionality.

The routing engine 110, in some examples, utilizes routing graph modification data 120 to generate constrained routing graph data. Routing graph modification data 120 indicates routing graph modifications that are applied to the routing graph 124 to generate a constrained routing graph. A routing graph modification is a change to a routing graph (e.g., a general-purpose routing graph) that reflects various factors including, for example, capabilities of the vehicle that is to execute a route, current roadway conditions, business policy considerations, and so on. A routing graph modification includes a graph element descriptor and a constraint.

A graph element descriptor is data describing one or more graph elements that are the subject of a routing graph modification. For example, a graph element descriptor can describe graph elements using one or more graph element properties. A graph element property is anything that describes a graph element and/or its corresponding roadway element. Example graph element properties include, for example, a unique identifier for the graph element, a roadway type of the corresponding roadway element (e.g., divided highway, urban street), a driving rule of the roadway element associated with the graph element (e.g., speed limit, access limitations), a type of maneuver to enter, exit, and/or traverse the corresponding roadway element, whether the corresponding roadway element leads to a specific type of roadway element (e.g., dead end, divided highway), and so on. In some examples, a graph element descriptor including a unique indicator of a particular graph element can be used to generate a routing graph modification that is applied to the particular graph element.

A constraint is an action applied to graph elements at a routing graph that are described by the graph element descriptor of a routing graph modification. Example constraints that may be applied to a graph element include removing the graph element from the routing graph, modifying (e.g., removing) transitions to or from a graph element, changing a cost associated with a graph element or transitions involving the graph element, and so forth. Costs may be changed up or down. For example, if the routing graph modification data 120 indicates that graph elements having a particular graph element property or set of graph element properties are disfavored, the costs to traverse and/or transition to the corresponding roadway elements can be increased. On the other hand, if the routing graph modification data 120 indicates that graph elements having a particular graph element property or set of constraint properties are favored, the costs to traverse and/or transition to the corresponding roadway elements can be decreased.

Another example constraint can include changing a required or recommended AV mode. For example, a graph element can be modified to indicate that an AV traversing the roadway element corresponding to the graph element should be operated in a semi-autonomous or manual mode.

Consider an example in which a routing policy forbids routing a vehicle through roadway elements that include or are in a school zone. A routing graph modification may include graph element descriptor data identifying graph elements that correspond to roadway elements having a school zone. A corresponding constraint includes removing the graph elements corresponding to such school zone roadway elements from the routing graph 124 and/or removing transitions to such school zone roadway elements In some examples, a constraint can be applied to graph elements other than those indicated by the graph element descriptor data. Consider an example routing graph modification that is to avoid cul-de-sacs. The associated constraint can involve removing connectivity to graph elements corresponding to cul-de-sac roadway elements and also removing graph elements corresponding to roadway elements that do not include cul-de-sacs, but can lead to other roadway elements that do include cul-de-sacs.

Routing graph modification data 120 can also include routing graph constraints related to vehicle capability. For example, vehicles of different types (e.g., autonomous vehicles, human-driven vehicles, different types of autonomous vehicles) can have different capabilities and, therefore, can be associated with different vehicle-capability-related routing graph modifications. Vehicle capability of an AV 102A, 102B, 102N may be and/or be derived from operation domain (OD) and/or operational design domain (ODD) data (also referred to herein as vehicle capability data). The vehicle capability data, if any, may be provided by the vehicle's manufacturer. In some examples, vehicle capability is supplemented based on the performance of an AV 102A, 102B, 102N or type of AV in executing transportation services. Routing graph modifications based on vehicle capability can include, for example, routing graph modifications that identify graph elements corresponding to roadway elements that have a property or properties (e.g., includes an unprotected left, is part of a controlled access highway) and constraint data indicating what is to be done to route components having the indicated property or properties. The graph elements corresponding to roadway elements that a particular type of AV 102A, 102B, 102N is not capable of traversing can be removed from the routing graph or can have connectivity data modified to remove transitions to those graph elements. For example, one or more connections to a graph element may be removed. If the properties of a graph element indicate that it corresponds to a roadway element including a maneuver that is undesirable for a vehicle, but not forbidden, then the routing engine 110 can increase the cost of the graph element and/or transitions thereto.

Other routing graph modifications that can be described by the routing graph modification data 120 may include, for example, policy routing graph modifications and operational routing graph modifications. Policy routing graph modifications include graph element properties that identify roadway elements subject to a policy routing graph modification and corresponding routing graph modifications. Policy routing graph modifications refer to types of roadway elements that are desirable for a vehicle to avoid or prioritize. An example policy routing graph modification is to avoid roadway elements that are in or pass through school zones. Another example policy routing graph modification is to avoid routing vehicles through residential neighborhoods. Yet another example policy routing graph modification is to favor routing vehicles on controlled-access highways, if available. Policy routing graph modifications can apply to some vehicles, some vehicle types, all vehicles, or all vehicle types.

Operational routing graph modifications can be based, for example, on the state of one or more roadways. For example, if a roadway is to be closed for a parade or for construction, an operational routing graph modification identifies properties (e.g., names or locations) of roadway elements that are part of the closure and an associated routing graph modification (e.g., removing the corresponding graph elements, removing transitions to the corresponding graph elements).

In some examples, the routing engine 110 applies routing feature flags. Routing feature flags modify the way that a routing graph, such as a constrained routing graph, is used to generate a route for an AV 102A, 102B, 102N. For example, a routing feature flag may describe a type of traversal of the constrained routing graph that is favored or disfavored for an AV 102A, 102B, 102N or type of AV.

Predicted routes for the one or more candidate AVs 102A, 102B, 102N generated by the routing engine 110 are provided to the service selection engine 113, which may select an AV 102A, 102B, 102N from among the one or more candidate AVs 102A, 102B, 102N to execute the requested transportation service. The service assignment system 104 (e.g., the service selection engine 113 thereof) sends transportation service data 130 to the selected AV (in this example, AV 102A). The transportation service data 130 describes the requested transportation service. The transportation service data 130 may describe the transportation service start location and transportation service end location. In some examples, transportation service data 130 also describes the user 114A, 114B, 114N who requested the transportation service. For example, the user 114A, 114B, 114N may provide identifying information (e.g., clothing color, photograph) that is provided to the AV 102A.

The AV 102A provides planned route data 132 for the transportation service. The planned route data 132 describes the route that the AV 102A plans to take to execute the transportation service. The planned route can be determined by a routing engine onboard the AV 102A and/or may be generated by an offboard routing engine.

The service assignment system 104 determines if the planned route is acceptable. For example, the service assignment system 104 may compare the planned route to one or more policies and/or compare the planned route to one or more capabilities of the AV 102A, 102B, 102N. If one or more of the selected routes is acceptable, the service assignment system 104 sends to the AV 102A an instruction to begin executing the transportation service, for example, according to the planned route. If the planned route is not acceptable, the service assignment system 104 may request that the AV 102A provide a different planned route and/or assign the transportation service to a different AV 102A, 102B, 102N.

The route difference engine 112 of the service assignment system 104 receives the planned route data 132 and compares the planned route described by the planned route data 132 to the predicted route generated by the service assignment system 104 for the AV 102A to execute the transportation service. The comparison, in some examples, yields difference data.

The difference data describes a difference between the predicted route and the planned route. For example, the difference data can describe a set of roadway elements that are included in the predicted route, but not in the planned route. In some examples, the difference data can describe a set of roadway elements that are included in the planned route but were not included in the predicted route.

The difference data can be used, as described herein, to modify a routing rule used by the routing engine 110 to generate predicted routes for AVs of the same type as the AV 102A. Changing a routing rule can include, for example, changing a routing graph modification, adding a routing graph modification, deleting a routing graph modification, changing a graph traversal rule, such as indicated by a routing feature flag, and so forth.

As described herein, the route difference engine 112 may modify a routing rule to favor or to disfavor a set or kind of roadway elements. Changing a routing rule to favor a set of roadway elements includes changes to the operation of the routing engine 110 that make it more likely that vehicles of the same type as the AV 102A are routed to the set of roadway elements. For example, the route difference engine 112 can favor a set of roadway elements by eliminating a routing graph modification that removed connectivity to the set of roadway elements. The route difference engine 112 can also favor a set of roadway elements by modifying an existing routing graph modification operating on the set of roadway elements, for example, by changing a constraint that removes the roadway elements from consideration at the routing graph to a constraint that adds a cost to routing through the roadway elements. In another example, the route difference engine 112 can favor the set of roadway elements by modifying the cost added to the set of roadway elements by an existing routing graph modification. In yet another example, the route difference engine 112 can favor a set of roadway elements by eliminating or modifying a graph traversal rule that disfavors or disallows routing to the set of roadway elements.

Changing a routing rule to disfavor a set of roadway elements includes changes to the operation of the routing engine 110 that make it less likely that vehicles of the same type as the AV 102A are routed to the set of roadway elements. This can include, for example, adding a routing graph modification that either removes the set of roadway elements from consideration at the constrained routing graph and/or adds a cost to the set of roadway elements. It may also include modifying an existing routing graph modification, for example, by increasing the cost of the roadway elements and/or removing the roadway elements from consideration at the constrained routing graph. In another example, the route difference engine 112 can modify a graph traversal rule, such as one indicated by a routing feature flag, to disfavor traversing the constrained routing graph in a way that routes through the set of roadway elements.

In some examples, the route difference engine 112 determines that the roadway elements describe a set of roadway elements having a common property. For example, the difference data may describe roadway elements that have a common speed limit (e.g., above 45 miles per hour), require a common maneuver (e.g., an unprotected left turn), or have another common property.

In some examples, the common property describes a connectivity of the roadway element (e.g., roadway elements connected to and/or within X distance of roadway elements that include a cul-de-sac). The route difference engine 112 may modify a routing rule based on the common property. For example, if the route difference engine 112 determines that the planned route data includes more than a threshold level of roadway elements having the common property, it may indicate that the routing engine 110 for the AV 102A favors roadway elements having the common property. In this case, the route difference engine 112 may modify a routing rule at the routing engine 110 to similarly favor those roadway elements.

In another example, if the route difference engine 112 determines that the predicted route data includes more than a threshold level of roadway elements having the common property, it may indicate that the routing engine 110 for the AV 102 disfavors roadway elements having the common property. In this case, the route difference engine 112 may modify a routing rule at the routing engine 110 to similarly disfavor those roadway elements.

In another example, the route difference engine 112 determines whether the difference data describes a set of roadway elements that had a particular status, for example, at the time that the roadway element was to be traversed by the AV 102A. A roadway element status describes a changeable condition of the roadway such as, for example, a traffic condition, an actor density, weather conditions, time of day, and so forth. The actor density of a roadway element describes the number of actors per unit area in the roadway element. Actors can include, for example, other vehicles, pedestrians, animals, and so forth. A traffic condition can include, for example, a traffic congestion and/or a traffic status (e.g., closed, under construction). Weather conditions can include, for example, precipitation, temperature, lighting conditions, and so forth. Lighting conditions due to weather conditions and/or time-of-day, for example, may affect the LIDAR or other sensors of the AV 102A.

The route difference engine 112 can determine the roadway element status of a roadway element, for example, by considering actual status data captured at or about the time that the transportation service is requested. In other examples, the route difference engine 112 considers roadway element status of a roadway element based on data describing past states of the roadway elements. For example, the actor density of a roadway element at 4:00 p.m. on a Tuesday can be estimated by considering historical actor densities for the roadway element sensed at 4:00 p.m. on Tuesdays.

If the route difference engine 112 determines that the difference data describes greater than a threshold number of roadway elements in the predicted route having a particular roadway element status, it may modify a routing rule to cause the routing engine 110 to disfavor roadway elements having the roadway element status. In some examples, if the route difference engine 112 determines that the difference data describes greater than a threshold number of roadway elements in the planned route that have the roadway element status, it may modify a routing rule to cause the routing engine 110 to favor roadway elements having the roadway element status.

In another example, the route difference engine 112 determines whether the difference data describes a set of roadway elements that have a particular risk level. The risk level of a roadway element describes the risk of an AV experiencing an adverse event at the roadway element. The risked adverse event can include, for example, disengaging an autonomous mode for the AV, an error causing the AV to pull-over and wait for assistance, a collision, and so forth. If the route difference engine 112 determines that the difference data describes greater than a threshold number of roadway elements in the predicted route having a risk greater than a threshold value, it may modify a routing rule to cause the routing engine 110 to disfavor roadway elements having risk greater than the threshold value. In some examples, if the route difference engine 112 determines that the difference data describes greater than a threshold number of roadway elements in the planned route having risk greater than the threshold value, it may modify a routing rule to cause the routing engine 110 to favor roadway elements having risk greater than the threshold value.

It will be appreciated that, in some examples, the comparisons performed herein between predicted routes and planned routes may be performed between predicted routes and actual routes. The service assignment system 104 may receive actual route data describing the route that an AV 102A, 102B, 102N actually took to execute an assigned transportation service. The comparison between predicted route data and actual route data may be used to modify one or more routing rules, as described herein.

Also, in some examples, comparisons may be performed between planned routes and one or more of simulated routes. The simulated routes may be generated using a software simulation of the AV 102A. For example, the simulated routes may be generated by the routing engine 110 using routing graph modifications associated with the AV 102A.

Consider an example in which one or more simulated route routes may include roadway elements having a high actor density. If the simulated routes indicate that the AV 102A will traverse those high-density roadway elements but the planned route indicates that the AV 102A will avoid the high-density roadway elements, the predicted routes generated by the routing engine 110 may be modified to also avoid roadway elements having high actor density.

FIG. 2 depicts a block diagram of an example vehicle 200, according to example aspects of the present disclosure. The vehicle 200 includes one or more sensors 201, a vehicle autonomy system 202, and one or more vehicle controls 207. The vehicle 200 is an AV, as described herein. The example vehicle 200 shows just one example arrangement of an AV. In some examples, AVs of different types can have different arrangements.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, and so forth.

The sensors 201 may also include one or more remote-detection sensors or sensor systems, such as a LIDAR system, a RADAR system, one or more cameras, and so forth. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as the Global Positioning System (GPS), a positioning system based on an Internet protocol (IP) address, triangulation and/or proximity to network access points or other network components (e.g., cellular towers, Wi-Fi access points), and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at different locations on the vehicle 200. As an example, in some implementations, one or more cameras and/or LIDAR sensors can be located in a pod or other structure that is mounted on a roof of the vehicle 200, while one or more RADAR sensors can be located in or behind the front and/or rear bumper(s) or body panel(s) of the vehicle 200. As another example, one or more cameras can be located at the front or rear bumper(s) of the vehicle 200. Other locations can be used as well.

The localizer system 230 receives some or all of the sensor data from the sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a service assignment system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the service assignment system 240. The service assignment system 240 is programmed to provide instructions to multiple vehicles, for example, as part of a fleet of vehicles for moving passengers and/or cargo. Data from the service assignment system 240 can be provided via a wireless network, for example.

The navigator system 213 receives one or more target locations from the commander system 211 and map data 226. The map data 226, for example, provides detailed information about the surrounding environment of the vehicle 200. The map data 226 provides information regarding identity and location of different roadways and roadway elements. A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle 200 to take to arrive at the one or more target locations. In some implementations, the navigator system 213 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 205, which commands the vehicle controls 207 to implement the route or route extension, as described herein. The navigator system 213 can generate routes as described herein using a general-purpose routing graph and routing graph modification data. Also, in examples where route data is received from the service assignment system 240, that route data can also be provided to the motion planning system 205.

The perception system 203 detects objects in the surrounding environment of the vehicle 200 based on sensor 201 data, the map data 226, and/or vehicle poses provided by the localizer system 230. For example, the map data 226 used by the perception system 203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the perception system 203.

Prediction data for an object is indicative of one or more predicted future locations of the object. For example, the prediction system 204 may predict where the object will be located within the next 5 seconds, 30 seconds, 200 seconds, and so forth. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203.

In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle such that the vehicle turns left at the intersection. Similarly, the prediction system 204 determines predicted trajectories for other objects, such as bicycles, pedestrians, parked vehicles, and so forth. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls 207 based at least in part on the predicted trajectories associated with the objects within the surrounding environment of the vehicle 200, the state data for the objects provided by the perception system 203, vehicle poses provided by the localizer system 230, the map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from the one or more sensors 201. For example, as new sensor data is obtained from the one or more sensors 201, the sensor data can be analyzed by the perception system 203, the prediction system 204, and the motion planning system 205 to determine the motion plan.

The motion planning system 205 can provide control commands to the one or more vehicle controls 207. For example, the one or more vehicle controls 207 can include throttle systems, brake systems, steering systems, and other control systems, each of which can include various vehicle controls (e.g., actuators or other devices that control gas flow, steering, and braking) to control the motion of the vehicle 200. The various vehicle controls 207 can include one or more controllers, control devices, motors, and/or processors.

The vehicle controls 207 include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlights, parking lights, running lights, and so forth. Controlling an auxiliary system may include, for example, modulating windshield wipers, a defroster, and so forth.

A throttle control system 234 is configured to receive a throttle command and bring about a response in the engine speed or other throttle mechanism of the vehicle. For example, the throttle control system 234 can instruct an engine and/or engine controller, or other propulsion system component, to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise be a part of the vehicle autonomy system 202 configured to control the vehicle 200 based at least in part on data obtained from the one or more sensors 201. For example, data obtained by the one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an AV based on sensor data.

The vehicle autonomy system 202 includes one or more computing devices, which may implement all or parts of the perception system 203, the prediction system 204, the motion planning system 205, and/or the localizer system 230. Descriptions of hardware and software configurations for computing devices to implement the vehicle autonomy system 202 and/or the service assignment system 104 of FIG. 1 are provided herein with reference to FIGS. 6 and 7.

Figure 3:
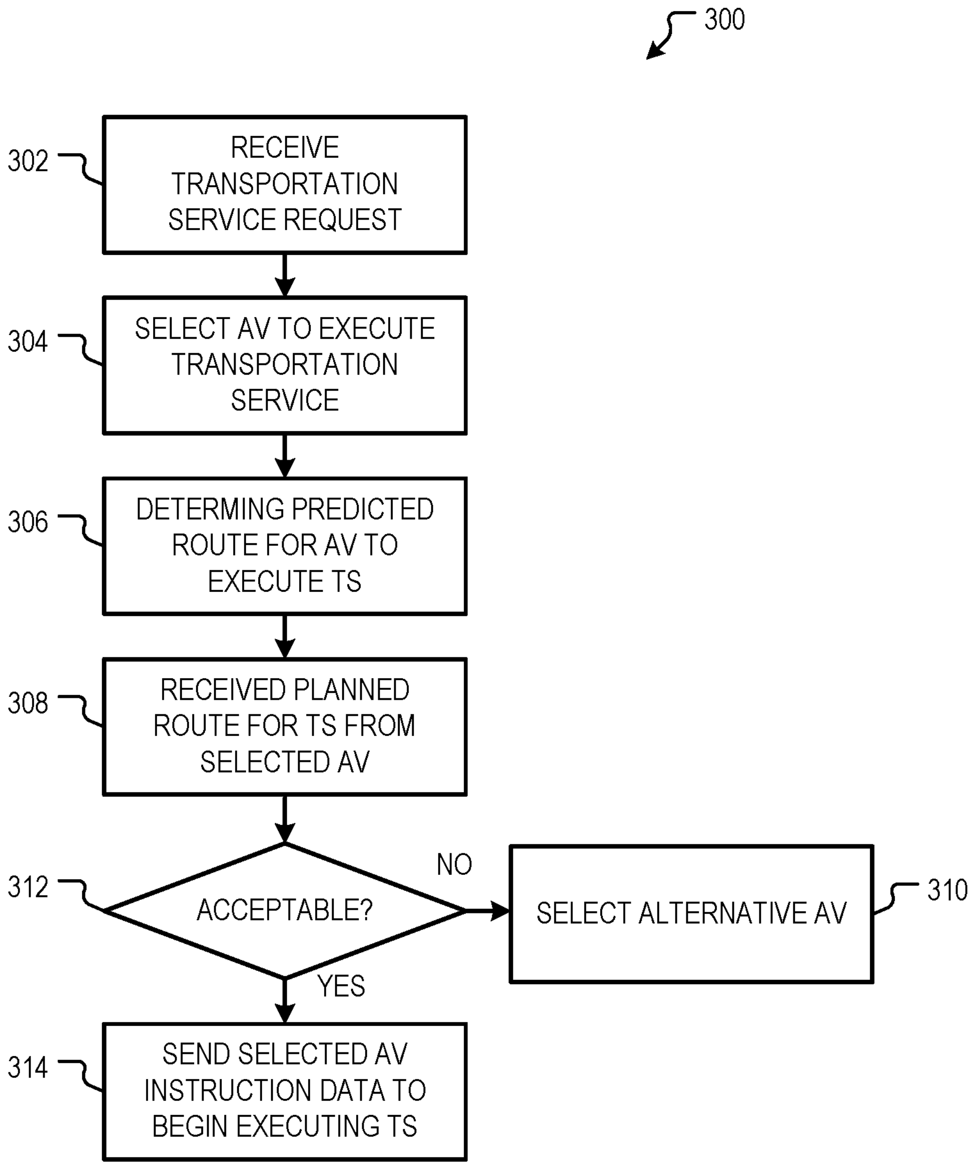
FIG. 3 is a flowchart showing one example of a process flow that can be executed by the service assignment system to assign a transportation service to an AV using route prediction.

FIG. 3 is a flowchart showing one example of a process flow 300 that can be executed by the service assignment system 104 to assign a transportation service to an AV 102A, 102B, 102N using route prediction.

At operation 302, the service assignment system 104 receives a transportation service request. The transportation service request may originate from user 114A, 114B, 114N. For example, the user 114A, 114B, 114N may utilize a user computing device 116A, 116B, 116N that executes an application that receives a user input indicating the desired transportation service and sends a transportation service request to the service assignment system.

At operation 304, the service assignment system 104 selects an AV 102A, 102B, 102N to execute the transportation service requested by the user 114A, 114B, 114N. The service assignment system 104 selects the AV 102A in any suitable manner. In some examples, the service assignment system 104 selects the AV 102A, 102B, 102C based on a current location of the selected AV 102A, 102B, 102C, the service start position for the transportation service, and/or whether the selected AV 102A, 102B, 102N is capable of executing the transportation service. Upon selecting the AV 102A, 102B, 102N, the service assignment system 104 may send to the selected AV transportation service data 130 describing the requested transportation service.

At operation 306, the service assignment system 104 determines a predicted route for the selected AV 102A, 102B, 102N. The predicted route is the route that the service assignment system 104 predicts that the selected AV 102A, 102B, 102N will take to execute the transportation service. The predicted route may be generated using the routing engine 110, as described herein. For example, the predicted route may be generated using one or more routing rules such as, for example, routing feature flags, routing graph modifications, and so forth. At operation 308, the service assignment system 104 receives from the selected AV 102A, 102B, 102N planned route data describing a planned route. The planned route is the route that the selected AV 102A, 102B, 102N plans to use to execute the transportation service. The planned route may be generated by a routing engine onboard the selected AV 102A, 102B, 102N or remote from the selected AV 102A, 102B, 102N. (For example, the selected AV 102A, 102B, 102N may utilize a remote routing engine that is different than and/or separate from the service assignment system 104.)

At operation 312, the service assignment system 104 determines whether the planned route provided by the selected AV 102A, 102B, 102N is acceptable. For example, the service assignment system 104 may compare the planned route to one or more policies and/or compare the planned route to one or more capabilities of the AV 102A, 102B, 102N. The policies and/or capabilities may be provided by the selected AV 102A, 102B, 102N and/or a proprietor of the selected AV 102A, 102B, 102N. In other examples, the policies and/or capabilities are derived by the service assignment system.

If the planned route is not acceptable, the service assignment system 104 selects an alternative AV to execute the requested transportation service at operation 310. If the planned route is acceptable, the service assignment system 104, at operation 314, sends instruction data to the selected AV 102A, 102B, 102N, where the instruction data instructs the selected AV 102A, 102B, 102N to begin executing the transportation service.

Figure 4:
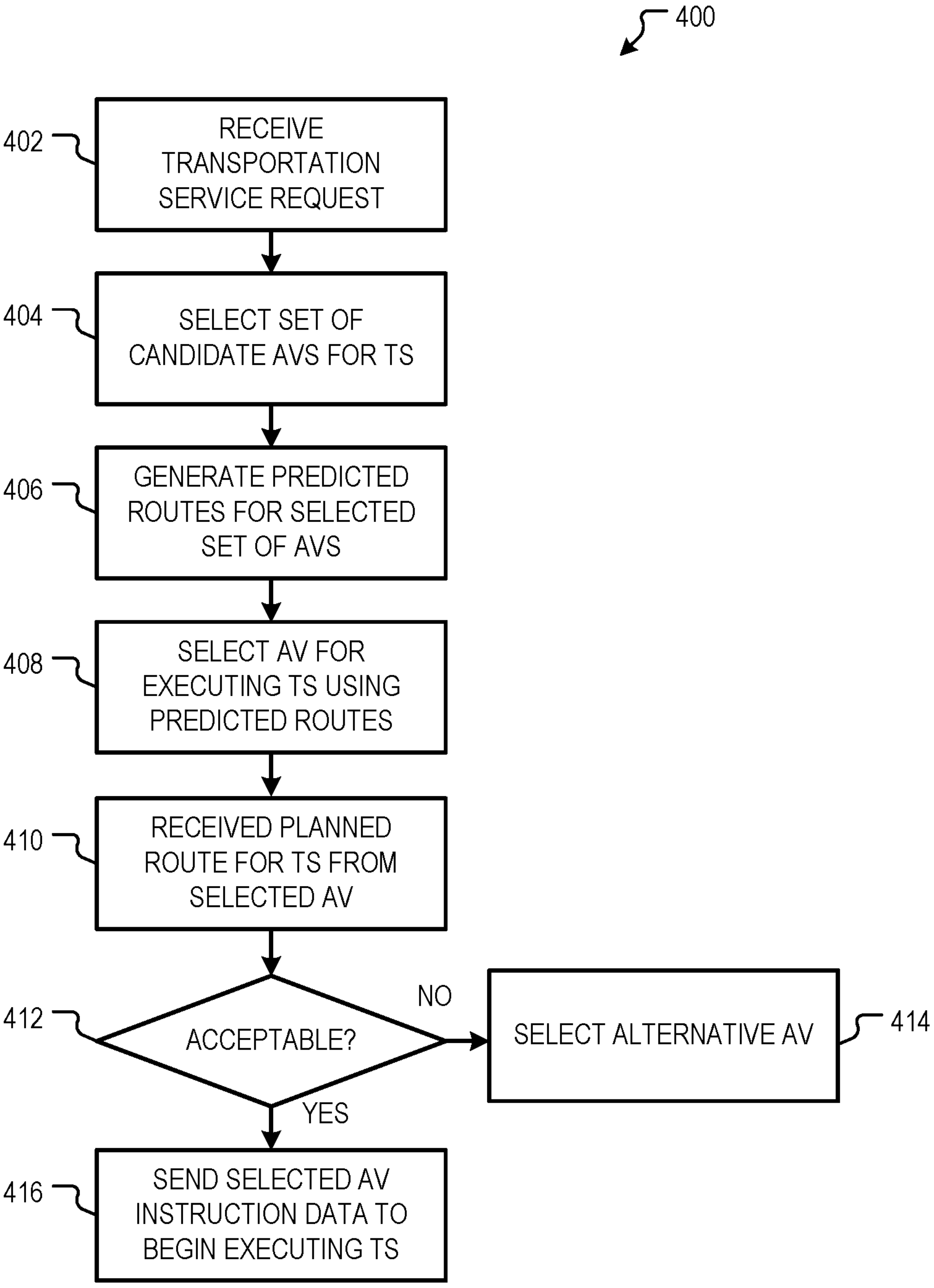
FIG. 4 is a flowchart showing another example of a process flow that can be executed by the service assignment system to assign a transportation service to an AV using route prediction.

FIG. 4 is a flowchart showing another example of a process flow 400 that can be executed by the service assignment system 104 to assign a transportation service to an AV 102A, 102B, 102N using route prediction. In the example of FIG. 4, the service assignment system 104 generates predicted routes for multiple AVs 104A, 104B, 104N and selects an AV for the transportation service based on the predicted routes. In this way, the accuracy of the predicted routes is utilized to select the best AV 102A, 102B, 102N for a transportation service.

At operation 402, the service assignment system 104 receives a transportation service request. The transportation service request may originate from user 114A, 114B, 114N via a user computing device 116A, 116B, 116N, as described herein. At operation 404, the service assignment system 104 selects a set of candidate AVs 102A, 102B, 102N for executing the requested transportation service. The candidate AVs 102A, 102B, 102N can be selected on any suitable criteria such as, for example, current location, the service start location, whether the AV is capable of executing the transportation service, and so forth. The service assignment system 104 may provide the candidate AVs 102A, 102B, 102N with transportation service data 130 describing the requested transportation service.

At operation 406, the service assignment system 104 generates predicted routes for each of the candidate AVs 102A, 102B, 102N. A predicted route may be generated for each candidate AV 102A, 102B, 102N, for example, as described herein. For example, the predicted route may be generated using one or more routing rules such as, for example, routing feature flags, routing graph modifications, and so forth. At operation 408, the service assignment system 104 selects from the candidate AVs 102A, 102B, 102N a first AV 102A to execute the transportation service. The first AV 102A may be selected in any suitable manner. For example, the first AV 102A may be selected based on the time to execute the predicted route for the first AV 102A versus the time to execute the predicted routes for the other candidate AVs 102B, 102N. In some examples, the first AV 102A may be the AV from the set of candidate AVs 102A, 102B, 102N that, according to its predicted route, would reach the service start location first.

At operation 410, the service assignment system 104 receives planned route data from the first AV 102A describing the first AV's planned route for executing the transportation service. At operation 412, the service assignment system 104 determines whether the planned route provided by the selected AV 102A, 102B, 102N is acceptable. If the planned route is not acceptable, the service assignment system 104 selects an alternative AV to execute the requested transportation service at operation 414. For example, the service assignment system 104 may select another AV from the set of candidate AVs 102A, 102B, 102N. If the planned route is acceptable, the service assignment system 104 sends instruction data to the first AV 102A at operation 416, where the instruction data instructs the selected AV 102A, 102B, 102N to begin executing the transportation service.

Figure 5:
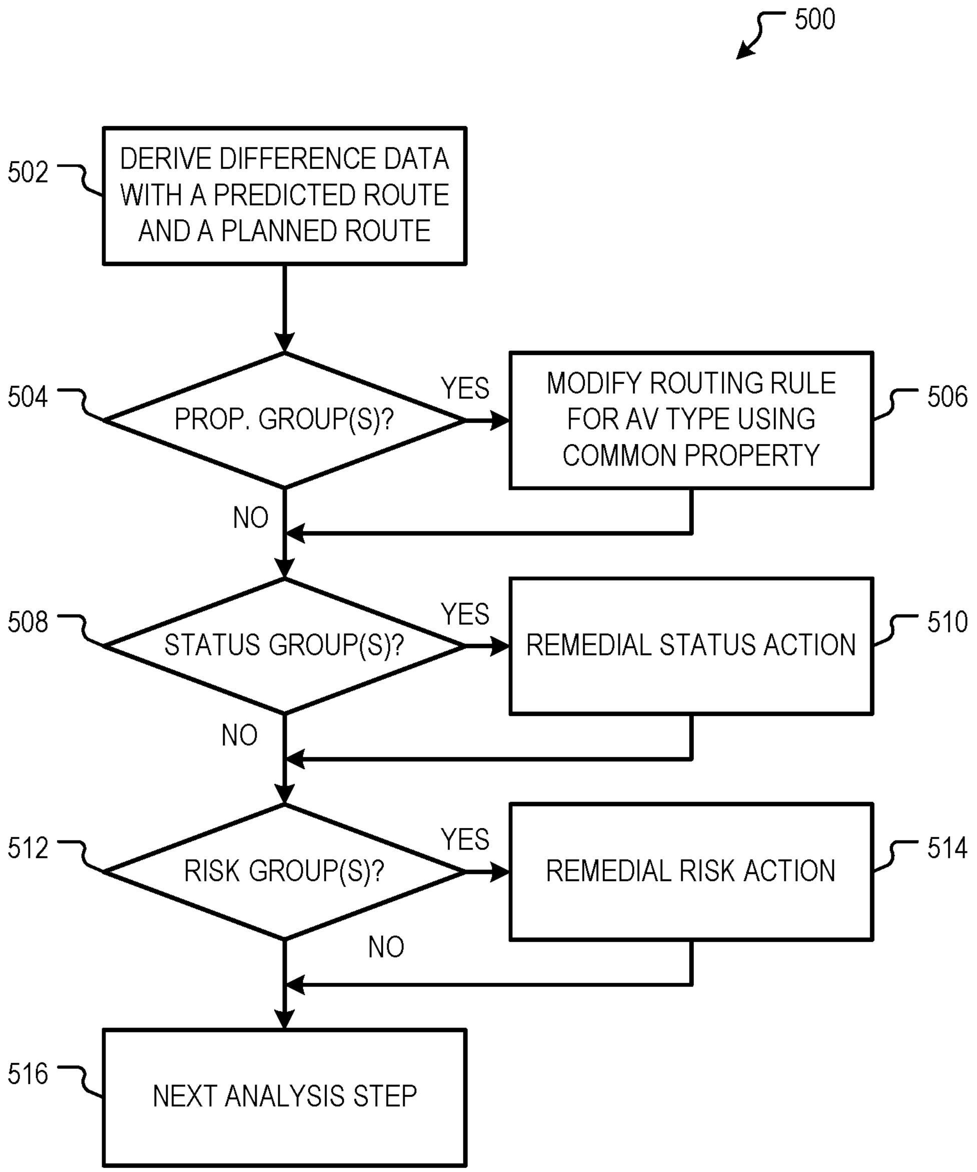
FIG. 5 is a flowchart showing one example of a process flow that may be executed by the service assignment system to modify a routing rule to improve the predicted routes generated by the service assignment system using planned route data.

FIG. 5 is a flowchart showing one example of a process flow 500 that may be executed by the service assignment system 104 (e.g., the route difference engine 112 thereof) to modify a routing rule to improve the predicted routes generated by the service assignment system 104 using planned route data. FIG. 5 shows the service assignment system 104 considering roadway elements with common properties (e.g., operation 504), roadway elements with common statuses (e.g., operation 508), and roadway elements having common risk levels (e.g., operation 512). It will be appreciated that any of these categories may alternately be considered in isolation and/or in any suitable combination.

The process flow 500 is described with respect to a single predicted route and a corresponding planned route. The predicted route is a route generated by the service assignment system 104 for an AV 102A, 102B, 102N to execute a transportation service such as, for example, as described at operations 306 and 406 described herein. The planned route is the corresponding route provided by the AV 102A, 102B, 102N for executing the same transportation service. Although FIG. 5 is described in the context of a single planned route and a single predicted route, the process flow 500, in some examples, can be executed in batch form processing multiple pairs of corresponding planned routes and predicted routes for multiple AVs 102A, 102B, 102N at the same time.

At operation 502, the route difference engine 112 derives difference data for a given predicted route and planned route pair. The difference data describes a difference between the predicted route and the planned route. For example, the difference data can describe a set of roadway elements that are included in one route of the predicted route and planned route pair, but not the other.

At operation 504, the route difference engine 112 determines whether the difference data describes one or more common property groups, where the common property groups include roadway elements described by the difference data that have one or more common properties. If one or more common property groups are found, the route difference engine 112, at operation 506, modifies one or more routing rule for the AV type that generated the planned route using the common property groups. If a common property group appears in the predicted route, for example, the route difference engine 112 may modify a routing rule for the AV type to disfavor roadway elements having the common property (e.g., increasing the cost of generating a planned route through roadway elements having the common property, removing roadway elements having the common property from consideration at the routing graph, adding or modifying a routing feature flag related to roadway elements having the common property). If the common property group appears in the planned route, the route difference engine 112 may modify a routing rule for the AV type to favor roadway elements having the common property (e.g., by decreasing the cost of generating a planned route through roadway elements having the common property, adding previously-excluded roadway elements for consideration at the routing graph, adding or modifying a routing feature flag related to roadway elements having the common property).

At operation 508, the route difference engine 112 determines whether the difference data describes one or more common status groups, where the common status groups include roadway elements described by the difference data that have one or more common statuses. If one or more common status groups are found, the route difference engine 112, at operation 510, modifies one or more routing rule for the AV type that generated the planned route using the common status groups. If a common status group appears in the predicted route, for example, the route difference engine 112 may modify a routing rule for the AV type to disfavor roadway elements having the common status. If the common status group appears in the planned route, the route difference engine 112 may modify a routing rule for the AV type to favor roadway elements having the common status.

At operation 512, the route difference engine 112 determines whether the difference data describes one or more common risk groups, where the common risk groups include roadway elements described by the difference data that have one or more common risks. If one or more common risk groups are found, the route difference engine 112, at operation 514, modifies one or more routing rule for the AV type that generated the planned route using the common risk groups. If a common risk group appears in the predicted route, for example, the route difference engine 112 may modify a routing rule for the AV type to disfavor roadway elements having the common risk. At operation 516, the route difference engine 112 may complete its processing and/or proceed to a next analysis set. For example, the next analysis step may include, for example, considering a next pair including a predicted route and a corresponding planned route for an AV 102A, 102B, 102N.

Figure 6:
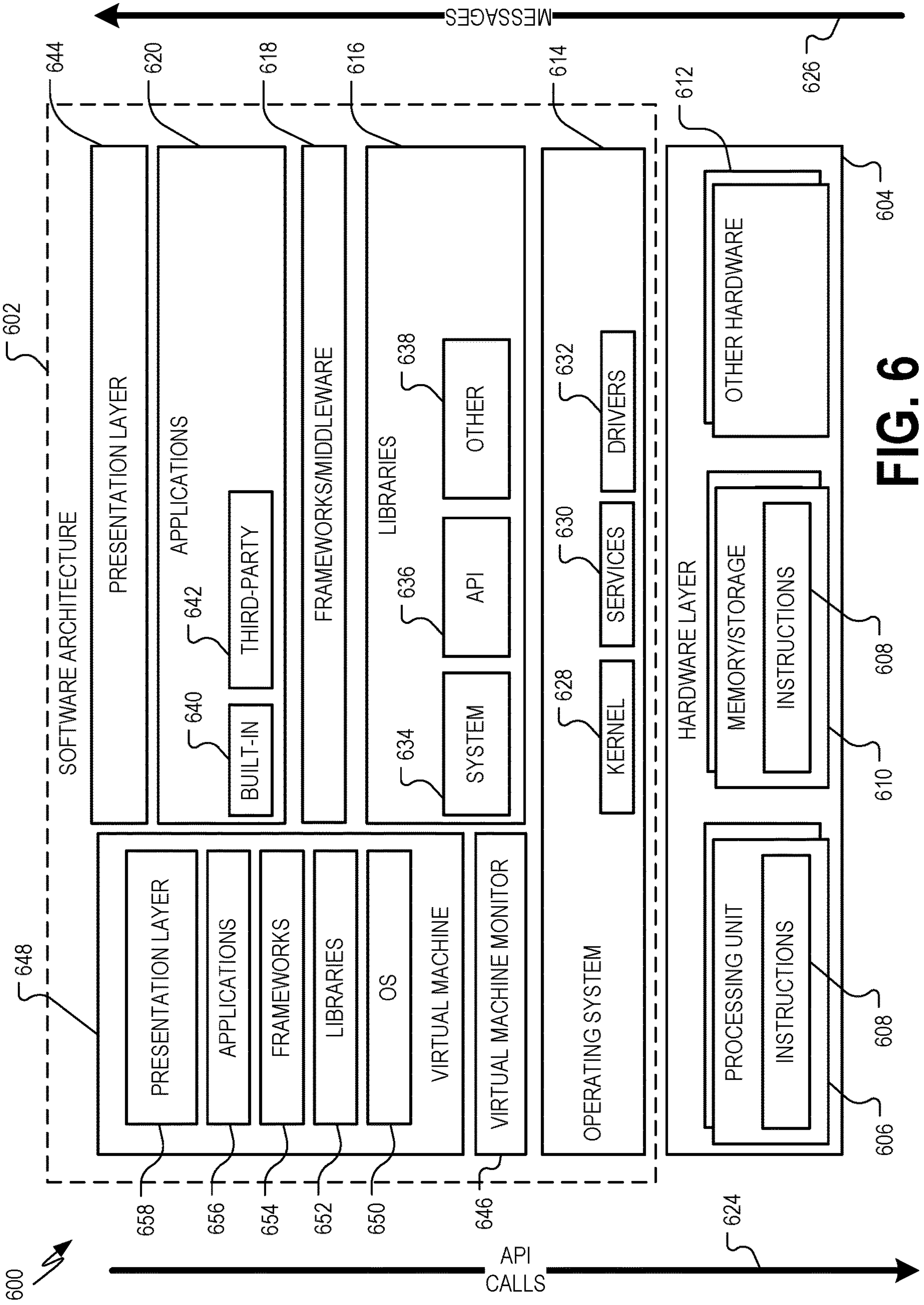
FIG. 6 is a block diagram showing one example of a software architecture for a computing device.

FIG. 6 is a block diagram 600 showing one example of a software architecture 602 for a computing device. The software architecture 602 may be used in conjunction with various hardware architectures, for example, as described herein. FIG. 6 is merely a non-limiting example of a software architecture 602, and many other architectures may be implemented to facilitate the functionality described herein. A representative hardware layer 604 is illustrated and can represent, for example, any of the above-referenced computing devices. In some examples, the hardware layer 604 may be implemented according to an architecture 700 of FIG. 7 and/or the software architecture 602 of FIG. 6.

The representative hardware layer 604 comprises one or more processing units 606 having associated executable instructions 608. The executable instructions 608 represent the executable instructions of the software architecture 602, including implementation of the methods, modules, components, and so forth of FIGS. 1-5. The hardware layer 604 also includes memory and/or storage modules 610, which also have the executable instructions 608. The hardware layer 604 may also comprise other hardware 612, which represents any other hardware of the hardware layer 604, such as the other hardware illustrated as part of the architecture 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620, and a presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature, and not all software architectures have all layers. For example, some mobile or special-purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of a hardware or software interrupt and, in response, cause the software architecture 602 to pause its current processing and execute an interrupt service routine (ISR) when an interrupt is received. The ISR may generate an alert.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be used by the applications 620 and/or other software components/modules. For example, the frameworks 618 may provide various graphical user interface (GUI) functions, high-level resource management, high-level location services, and so forth. The frameworks 618 may provide a broad spectrum of other APIs that may be used by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 642 may invoke the API calls 624 provided by the mobile operating system such as the operating system 614 to facilitate functionality described herein.

The applications 620 may use built-in operating system functions (e.g., kernel 628, services 630, and/or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 6, this is illustrated by a virtual machine 648. A virtual machine creates a software environment where applications/modules can execute as if they were executing on a hardware computing device. The virtual machine 648 is hosted by a host operating system (e.g., the operating system 614) and typically, although not always, has a virtual machine monitor 646, which manages the operation of the virtual machine 648 as well as the interface with the host operating system (e.g., the operating system 614). A software architecture executes within the virtual machine 648, such as an operating system 650, libraries 652, frameworks/middleware 654, applications 656, and/or a presentation layer 658. These layers of software architecture executing within the virtual machine 648 can be the same as corresponding layers previously described or may be different.

Figure 7:
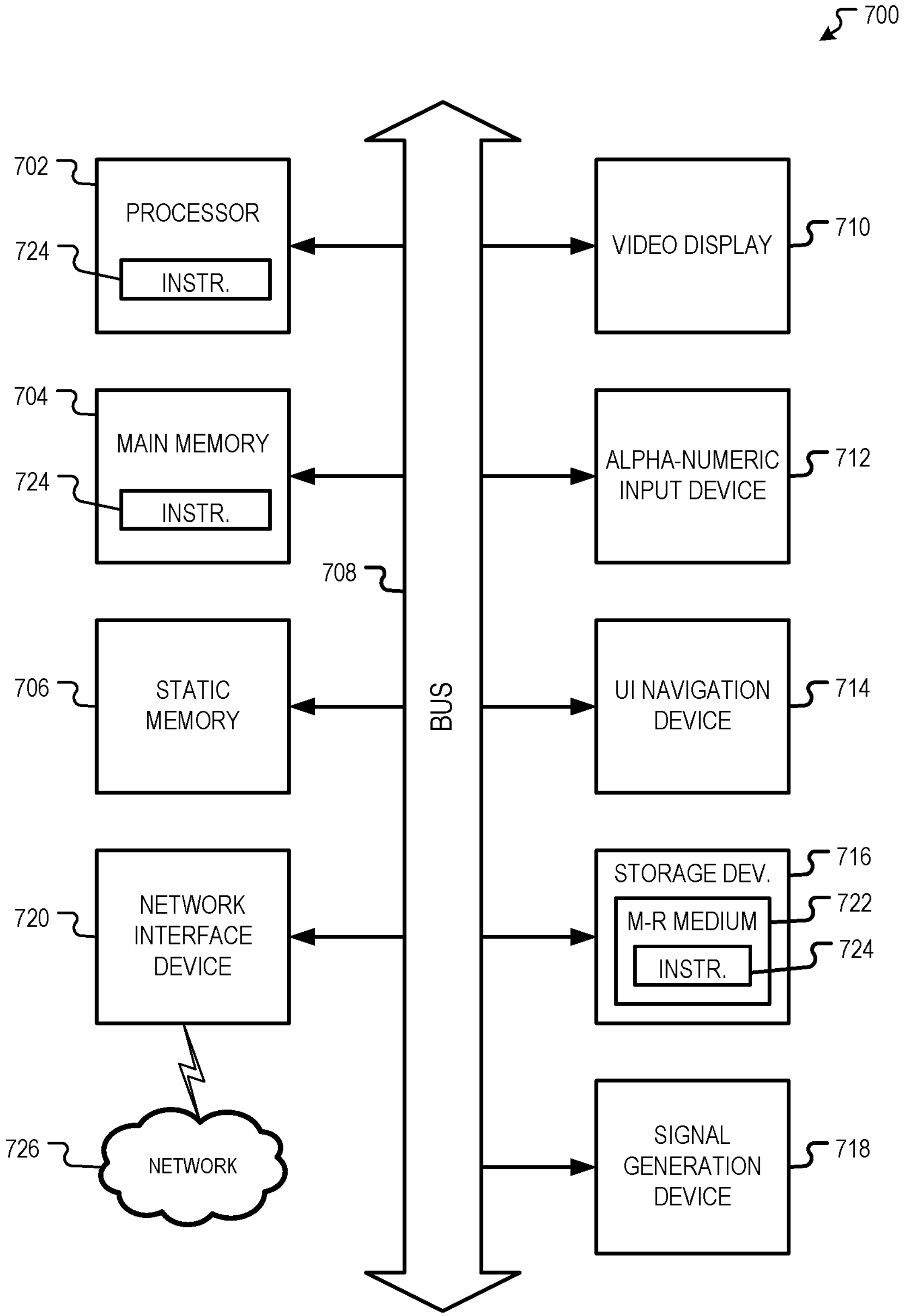
FIG. 7 is a block diagram illustrating a computing device hardware architecture.

FIG. 7 is a block diagram illustrating a computing device hardware architecture 700, within which a set or sequence of instructions can be executed to cause a machine to perform examples of any one of the methodologies discussed herein. The hardware architecture 700 describes a computing device for executing the vehicle autonomy system, described herein.

The architecture 700 may operate as a standalone device or may be connected (e.g., networked) to other machines. In a networked deployment, the architecture 700 may operate in the capacity of either a server or a client machine in server-client network environments, or it may act as a peer machine in peer-to-peer (or distributed) network environments. The architecture 700 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 700 includes a processor unit 702 comprising at least one processor (e.g., a central processing unit (CPU), a graphics processing unit (GPU), or both, processor cores, compute nodes). The architecture 700 may further comprise a main memory 704 and a static memory 706, which communicate with each other via a link 708 (e.g., a bus). The architecture 700 can further include a video display unit 710, an input device 712 (e.g., a keyboard), and a UI navigation device 714 (e.g., a mouse). In some examples, the video display unit 710, input device 712, and UI navigation device 714 are incorporated into a touchscreen display. The architecture 700 may additionally include a storage device 716 (e.g., a drive unit), a signal generation device 718 (e.g., a speaker), a network interface device 720, and one or more sensors (not shown), such as a GPS sensor, compass, accelerometer, or other sensor.

In some examples, the processor unit 702 or another suitable hardware component may support a hardware interrupt. In response to a hardware interrupt, the processor unit 702 may pause its processing and execute an ISR, for example, as described herein.

The storage device 716 includes a machine-readable medium 722 on which is stored one or more sets of data structures and instructions 724 (e.g., software) embodying or used by any one or more of the methodologies or functions described herein. The instructions 724 can also reside, completely or at least partially, within the main memory 704, within the static memory 706, and/or within the processor unit 702 during execution thereof by the architecture 700, with the main memory 704, the static memory 706, and the processor unit 702 also constituting machine-readable media.

Executable Instructions and Machine-Storage Medium

The various memories (i.e., 704, 706, and/or memory of the processor unit(s) 702) and/or the storage device 716 may store one or more sets of instructions and data structures (e.g., the instructions 724) embodying or used by any one or more of the methodologies or functions described herein. These instructions, when executed by the processor unit(s) 702, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 724 can further be transmitted or received over a communications network 726 using a transmission medium via the network interface device 720 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A system for providing transportation services, comprising:

a service assignment system comprising at least one processor, the service assignment system being programmed to perform operations comprising:

receiving, at the service assignment system, a transportation service request from a user, the transportation service request describing a transportation service having a start location and an end location;

selecting, by the service assignment system, a first set of candidate autonomous vehicles (AVs) of a first AV type, the first set of candidate AVs capable of executing the transportation service, the first set of candidate AVs comprising a first AV;

determining, by the service assignment system, a first predicted route for the first AV using vehicle capability data describing autonomous vehicle operational capabilities of the first AV type and first difference data, the first difference data generated by the service assignment system by comparing, for a prior transportation service previously assigned to the previous AV of the first AV type by the service assignment system, at least one roadway element difference between a previous predicted route generated by the service assignment system for the prior transportation service for the previous AV of the first AV type and a previous planned route generated by and received from the previous AV of the first AV type in response to prior instruction data transmitted from the service assignment system to the previous AV, the previous planned route describing a transportation service route generated by and planned for the previous AV to execute the prior transportation service;

selecting, by the service assignment system, the first AV based on the first predicted route for executing the transportation service; and transmitting instruction data from the service assignment system to the first AV, the instruction data causing the first AV to begin executing the transportation service based on the first predicted route.

2. The system of claim 1, the operations further comprising:

selecting a second set of candidate AVs, the second set of candidate AVs capable of executing the transportation service request, the second set of candidate AVs comprising the first AV and a second AV of a second AV type;

determining, by the service assignment system, a second predicted route for the second AV using vehicle capability data describing the second AV type and second difference data indicating at least one roadway element included in a previous predicted route for a previous AV of the second AV type and not included in a previous planned route received from the previous AV of the second AV type, the second AV type vehicle capability data different from the first AV type vehicle capability data; and selecting, by the service assignment system, the first AV from the second set of candidate AVs to execute the transportation service, the selecting being based in part on the first predicted route and the second predicted route.

3. The system of claim 2, the operations further comprising:

determining, by the service assignment system, third difference data describing a difference between the first predicted route and the first planned route; and determining, by the service assignment system, a predicted route for a third AV of the first AV type based at least in part on the third difference data.

4. The system of claim 3, the operations further comprising:

determining, by the service assignment system, that a portion of roadway elements described by the third difference data is described by a common roadway element property, the common roadway element property comprising at least one of a cost parameter, a traversal characteristic, or a connectivity feature associated with the roadway elements, the portion of roadway elements included in a previous predicted route for a previous AV of the first AV type and not included in a previous third planned route received for the third AV of the first AV type; and modifying a routing rule associated with the first AV type to disfavor roadway elements having the common roadway element property.

5. The system of claim 4, wherein the common roadway element property describes a connectivity between roadway elements.

6. The system of claim 4, wherein the common roadway element property describes an actor density above a threshold value.

7. The system of claim 4, wherein the common roadway element property describes a traffic condition.

8. The system of claim 4, wherein modifying the routing rule associated with the first AV type comprises raising a cost for routing AVs of the first AV type to roadway elements having the common roadway element property.

9. The system of claim 4, wherein modifying the routing rule associated with the first AV type comprises modifying a routing graph associated with the first AV type for generating predicted routes.

10. The system of claim 4, wherein the difference data is based on at least one of the previous AV traversing a previously predicted route, the previous AV traversing a previously planned route, or a simulated AV of the first AV type traversing a simulated route.

11. The system of claim 3, the operations further comprising:

selecting a first roadway element status using the first difference data; and providing first roadway element status data describing the first roadway element status to the third AV.

12. The system of claim 3, the operations further comprising:

determining, by the service assignment system, third difference data describing a difference between the first predicted route and the first predicted route;

determining a risk level associated with at least one roadway element described by the third difference data; and determining not to select a third AV of the first AV type to execute a second transportation service based at least in part on the risk level.

13. A method of providing transportation services, comprising:

receiving, by a service assignment system, a transportation service request from a user, the transportation service request describing a transportation service having a start location and an end location;

selecting, by the service assignment system, a first set of candidate autonomous vehicles (AVs) of a first AV type, the first set of candidate AVs capable of executing the transportation service, the first set of candidate AVs comprising a first AV;

determining, by the service assignment system, a first predicted route for the first AV using vehicle capability data describing autonomous vehicle operational capabilities of the first AV type and first difference data, the first difference data generated by the service assignment system by comparing, for a prior transportation service previously assigned to the previous AV of the first AV type by the service assignment system, at least one roadway element difference between a previous predicted route generated by the service assignment system for the prior transportation service for the previous AV of the first AV type and a previous planned route generated by and received from the previous AV of the first AV type in response to prior instruction data transmitted from the service assignment system to the previous AV, the previous planned route describing a transportation service route generated by and planned for the previous AV to execute the prior transportation service;

selecting, by the service assignment system, the first AV based on the first predicted route for executing the transportation service; and transmitting instruction data from the service assignment system to the first AV, the instruction data causing the first AV to begin executing the transportation service based on the first predicted route.

14. The method of claim 13, further comprising:

selecting a second set of candidate AVs, the second set of candidate AVs capable of executing the transportation service request, the second set of candidate AVs comprising the first AV and a second AV of a second AV type;

determining, by the service assignment system, a second predicted route for the second AV using vehicle capability data describing the second AV type and second difference data indicating at least one roadway element included in a previous predicted route for a previous AV of the second AV type and not included in a previous planned route received from the previous AV of the second AV type, the second AV type vehicle capability data different from the first AV type vehicle capability data; and selecting, by the service assignment system, the first AV from the second set of candidate AVs to execute the transportation service, the selecting being based in part on the first predicted route and the second predicted route.

15. The method of claim 14, further comprising:

determining, by the service assignment system, third difference data describing a difference between the first predicted route and the first planned route; and determining, by the service assignment system, a predicted route for a third AV of the first AV type based at least in part on the third difference data.

16. The method of claim 15, further comprising:

determining, by the service assignment system, that a portion of roadway elements described by the third difference data are described by a common roadway element property, the common roadway element property comprising at least one of a cost parameter, a traversal characteristic, or a connectivity feature associated with the roadway elements, the portion of roadway elements included in a previous predicted route for a previous AV of the first AV type and not included in a previous third planned route received for the third AV of the first AV type, and modifying a routing rule associated with the first AV type to disfavor roadway elements having the common roadway element property.

17. The method of claim 16, wherein the common roadway element property describes a connectivity between roadway elements.

18. The method of claim 16, wherein the common roadway element property describes an actor density above a threshold value.

19. The method of claim 16, wherein the common roadway element property describes a traffic condition.

20. A non-transitory machine-readable medium comprising instructions thereon that, when executed by at least one processor, causes the at least one processor to perform operations comprising:

receiving a transportation service request at a service assignment system from a user, the transportation service request describing a transportation service having a start location and an end location;

selecting, at the service assignment system, a first set of candidate autonomous vehicles (AVs) of a first AV type, the first set of candidate AVs capable of executing the transportation service, the first set of candidate AVs comprising a first AV;

determining, at the service assignment system, a first predicted route for the first AV using vehicle capability data describing autonomous vehicle operational capabilities of the first AV type and first difference data, the first difference data generated by the service assignment system by comparing for a prior transportation service previously assigned to the previous AV of the first AV type by the service assignment system, at least one roadway element difference between a previous predicted route generated by the service assignment system for the prior transportation service for the previous AV of the first AV type and a previous planned route generated by and received from the previous AV of the first AV type in response to prior instruction data transmitted from the service assignment system to the previous AV, the previous planned route describing a transportation service route generated by and planned for the previous AV to execute the prior transportation service;

selecting, at the service assignment system, the first AV based on the first predicted route for executing the transportation service; and transmitting instruction data from the service assignment system to the first AV, the instruction data causing the first AV to begin executing the transportation service based on the first predicted route.

* * * * *